United States Patent
Todd (10) Patent No.: US 10,649,967 B2
(45) Date of Patent: May 12, 2020

(54) MEMORY OBJECT POOL USE IN A DISTRIBUTED INDEX AND QUERY SYSTEM

(71) Applicant: VMware, Inc., Palo Alto, CA (US)

(72) Inventor: Christopher Todd, Fircrest, WA (US)

(73) Assignee: VMware, Inc., Palo Alto, CA (US)

( * ) Notice: Subject to any disclaimer, the term of this patent is extended or adjusted under 35 U.S.C. 154(b) by 353 days.

(21) Appl. No.: 15/653,042

(22) Filed: Jul. 18, 2017

(65) Prior Publication Data

US 2019/0026325 A1 Jan. 24, 2019

(51) Int. Cl.
| | |
|---|---|
| G06F 16/93 | (2019.01) |
| G06F 16/22 | (2019.01) |
| G06F 9/50 | (2006.01) |
| G06F 12/02 | (2006.01) |
| G06F 16/27 | (2019.01) |

(52) U.S. Cl.
CPC ........ G06F 16/2237 (2019.01); G06F 9/5016 (2013.01); G06F 12/023 (2013.01); G06F 16/27 (2019.01); G06F 16/93 (2019.01); *G06F 2212/1044* (2013.01)

(58) Field of Classification Search
CPC .................................................. G06F 12/0871
USPC ........................ 707/693; 711/E12.06; 710/68
See application file for complete search history.

(56) References Cited

U.S. PATENT DOCUMENTS

| | | | | |
|---|---|---|---|---|
| 6,040,917 | A | * 3/2000 | Campbell | ............. G06K 15/02 |
| | | | | 358/1.17 |
| 9,432,298 | B1 | 8/2016 | Smith | |
| 2004/0030847 | A1* | 2/2004 | Tremaine | ............. G06F 12/023 |
| | | | | 711/154 |
| 2015/0019514 | A1 | 1/2015 | Forster et al. | |
| 2016/0328488 | A1 | 11/2016 | Lytle | |
| 2017/0235513 | A1 | 8/2017 | Zhang | |
| 2018/0262573 | A1 | 9/2018 | Przybylski et al. | |

\* cited by examiner

*Primary Examiner* — Baoquoc N To (57) ABSTRACT

In a method of memory object pool use in a distributed index and query system, a plurality of memory object pools is maintained. A batch of documents is serialized into a first memory object borrowed from a first memory object pool, of the memory object pools, to achieve a first segment comprising a serialized data array, an offset index, and a document count. The serialized data array is compressed into a second memory object borrowed from a second memory object pool, of the memory object pools, to achieve a second segment comprising a compressed serialized data array, the offset index, and the document count. Subsequent to the compression, the first memory object is released back to the first memory object pool. The second segment is written to a data storage device. Subsequent to the writing, the second memory object is released back to the second memory object pool.

20 Claims, 7 Drawing Sheets

MAINTAINING, IN A MEMORY OF THE DISTRIBUTED INDEX AND QUERY SYSTEM, A PLURALITY OF MEMORY OBJECT POOLS
801

↓

SERIALIZING A BATCH OF DOCUMENTS INTO A FIRST MEMORY OBJECT BORROWED FROM A FIRST MEMORY OBJECT POOL OF THE PLURALITY OF MEMORY OBJECT POOLS TO ACHIEVE A FIRST SEGMENT COMPRISING A SERIALIZED DATA ARRAY, AN OFFSET INDEX DESCRIBING LOCATIONS OF DOCUMENTS OF THE BATCH OF DOCUMENTS WITHIN THE SERIALIZED DATA ARRAY, AND A DOCUMENT COUNT DESCRIBING A TOTAL NUMBER OF THE DOCUMENTS
805

↓

COMPRESSING THE SERIALIZED DATA ARRAY INTO A SECOND MEMORY OBJECT BORROWED FROM A SECOND MEMORY OBJECT POOL OF THE PLURALITY OF MEMORY OBJECT POOLS TO ACHIEVE A SECOND SEGMENT COMPRISING A COMPRESSED SERIALIZED DATA ARRAY, THE OFFSET INDEX, AND THE DOCUMENT COUNT
810

↓

SUBSEQUENT TO THE COMPRESSING, RELEASING THE FIRST MEMORY OBJECT BACK TO THE FIRST MEMORY OBJECT POOL
815

↓

WRITING THE SECOND SEGMENT TO A DATA STORAGE DEVICE
820

↓

SUBSEQUENT TO THE WRITING, RELEASING THE SECOND MEMORY OBJECT BACK TO THE SECOND MEMORY OBJECT POOL
825

```
┌─────────────────────────────────────────────────────────────┐
│ MAINTAINING, IN A MEMORY OF THE DISTRIBUTED INDEX AND QUERY │
│ SYSTEM BY A MEMORY MANAGER OF THE DISTRIBUTED INDEX AND QUERY│
│     SYSTEM, A PLURALITY OF MEMORY OBJECT POOLS              │
│                         901                                  │
└─────────────────────────────────────────────────────────────┘
                              ▼
┌─────────────────────────────────────────────────────────────┐
│ IN RESPONSE TO A QUERY, READING A FIRST SEGMENT FROM A DATA │
│ STORAGE DEVICE INTO A FIRST MEMORY OBJECT BORROWED FROM A FIRST│
│ MEMORY OBJECT POOL OF THE PLURALITY OF MEMORY OBJECT POOLS, THE│
│ FIRST SEGMENT COMPRISING A COMPRESSED SERIALIZED DATA ARRAY, AN│
│    OFFSET INDEX DESCRIBING LOCATIONS OF DOCUMENTS IN AN     │
│ UNCOMPRESSED VERSION OF THE COMPRESSED SERIALIZED DATA ARRAY,│
│ AND A DOCUMENT COUNT DESCRIBING A NUMBER OF THE DOCUMENTS IN│
│          THE COMPRESSED SERIALIZED DATA ARRAY                │
│                         930                                  │
└─────────────────────────────────────────────────────────────┘
                              ▼
┌─────────────────────────────────────────────────────────────┐
│ DECOMPRESSING THE COMPRESSED SERIALIZED DATA ARRAY INTO A   │
│ SECOND MEMORY OBJECT BORROWED FROM A SECOND MEMORY OBJECT   │
│ POOL OF THE PLURALITY OF MEMORY OBJECT POOLS TO ACHIEVE A   │
│ SECOND SEGMENT COMPRISING THE UNCOMPRESSED VERSION OF THE   │
│ SERIALIZED DATA ARRAY, THE OFFSET INDEX, AND THE DOCUMENT COUNT│
│                         935                                  │
└─────────────────────────────────────────────────────────────┘
                              ▼
┌─────────────────────────────────────────────────────────────┐
│ SUBSEQUENT TO THE DECOMPRESSING, RELEASING THE FIRST MEMORY │
│        OBJECT BACK TO THE FIRST MEMORY OBJECT POOL          │
│                         940                                  │
└─────────────────────────────────────────────────────────────┘
                              ▼
┌─────────────────────────────────────────────────────────────┐
│ DE-SERIALIZING A DOCUMENT FROM THE SECOND MEMORY OBJECT TO  │
│                    SATISFY THE QUERY                         │
│                         945                                  │
└─────────────────────────────────────────────────────────────┘
```

MEMORY OBJECT POOL USE IN A DISTRIBUTED INDEX AND QUERY SYSTEM

BACKGROUND

Some examples of modern distributed computing systems include networked computers, net servers, and larger enterprise systems. These and other distributed computing systems often involve databases that contain bundles of textual data, which can be thought of and referred to as "documents," and which may be indexed and queried.

A distributed index and query system processes incoming documents to create a searchable index while at the same time processing queries on the index or indexes and documents indexed therein. In a resource constrained environment, the index and query tasks compete for system resources such as: network throughput, bus bandwidth, memory, disk speed, various cache sizes, and processor usage. Contention between resources and/or problems in scheduling index and query tasks results in poor performance of the system. Poor performance may be evidenced by a slowdown in indexing new documents, a slowdown in querying response times, or a slowdown of both tasks.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments. In general, embodiments described herein provide for improvements in and operational efficiency increases in computing systems (such as computing systems that perform both index and query of documents).

Notation and Nomenclature

Unless specifically stated otherwise as apparent from the following discussions, it is appreciated that throughout the present Description of Embodiments, discussions utilizing terms such as "maintaining," "serializing," "compressing," "releasing," "writing," "reading," "decompressing," "de-serializing," "assigning," "setting," "trimming," "achieving," "allocating," "using," "routing," "borrowing," "loaning," "loaning out," "determining," or the like, often refer to the actions and processes of an electronic computing device or system, such as an index and query system or a distributed computing system, as but two examples. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

A distributed index and query system processes documents into a searchable format. These documents are text based files that are processed in batches, stored as a list of documents. In order to write and read these lists of documents from memory onto a data storage device (such as a hard disk drive) for long term storage, the list of documents is serialized into an array of bytes and compressed. In order to read one or more of the stored documents from the data storage device, an array of bytes must be read from data storage device, decompressed, and de-serialized. The performance of a distributed index and query system is directly tied to how many times and how efficiently this storage and retrieval happens. In particular, the rapid allocation of variable sized byte arrays from memory for the serializing, compressing, decompressing, and de-serializing can lead to long delays while a memory manager in the system allocates an exact amount of memory and/or collects and compacts previously allocated memory so that it can be reallocated. Herein, techniques are described which speed this allocation process and eliminate many instances of collection and/or compaction, thus speeding overall allocation of memory and processes that depend upon the allocation of memory.

As described herein, the memory of a distributed index and query system a plurality of memory object pools. Each pool includes one or more memory objects. A memory object is an array of memory bytes that has already been allocated, and that can be borrowed by a processing thread without the need for going through a process to allocate some specific amount of memory. The particular pool from which a memory object is borrowed, is dependent on the task being performed. Over time, the size of the memory objects each of the pools becomes tailored toward the size needed for a particular task. This prevents, in most cases, inefficiently using a giant memory object for a task that only needed a small memory object; and likewise reduces instances where more bytes of memory need to be allocated to a memory object that was insufficient in size for a task. Preventing/reducing these instances, improves the efficiency of the index and query system.

A memory object from the memory object pool can be exclusively borrowed by a processing thread, which then has exclusive read/write access to the memory addresses of the memory object while borrowing it. Herein, "borrowing" refer to this exclusive borrowing. Typically, after the processing thread is finished with a task that required it to borrow the memory object, the processing thread releases the memory object back to the memory object pool where it can be then be borrowed by any other processing thread. An exception is that a memory object that contains data that has been decompressed may be placed in a cache within the memory, in case another query needs access to one or more documents that have just been decompressed. With the borrowing, no effort is expended by the memory manager to allocate an exact size of memory to a memory object. Whatever size the memory object is, is what is borrowed; and at any given time some or all memory objects in a particular memory object pool may have different sizes from one another. If a borrowed memory object is too big for the task being conducted by the processing thread that borrowed it, the processing thread may simply use the memory object without the memory manager trimming the size. If a borrowed object is too small for the task being conducted by the processing thread, the memory manager allocates additional memory to the memory object and the memory object is grown and will be larger when it is finally released back to the memory object pool. This pooling technique, reduces or eliminates the need for compaction after use of memory and streamlines the allocation of memory as very little time is spent by the memory manager altering the size of a memory object that is allocated—typically only, when the size needs to be increased. Using multiple pools, each for a dedicated task type, adds further efficiencies to the overall use of a memory by increasing the likelihood that the borrowed memory objects will be closer to the size needed, rather than too small or far too big.

Discussion begins with a description of an example distributed index and query system that includes multiple computer systems. Operation of various components of the distributed index and query system is described. A plurality of memory object pools is described. Techniques for using the memory object pools are described. Descriptions of serialization, compression, de-compression, and de-serialization are provided in conjunction with illustration of various stages in the life-cycle of a segment that includes a serialized list of documents. Examples of flags on memory objects are illustrated, as is a scheme for storing segments within a fixed size storage region on a data storage device. Operation of various components of a query and indexing system are further described in conjunction with description of various methods of memory object pool use.

Example Distributed Index and Query System

Figure 1:
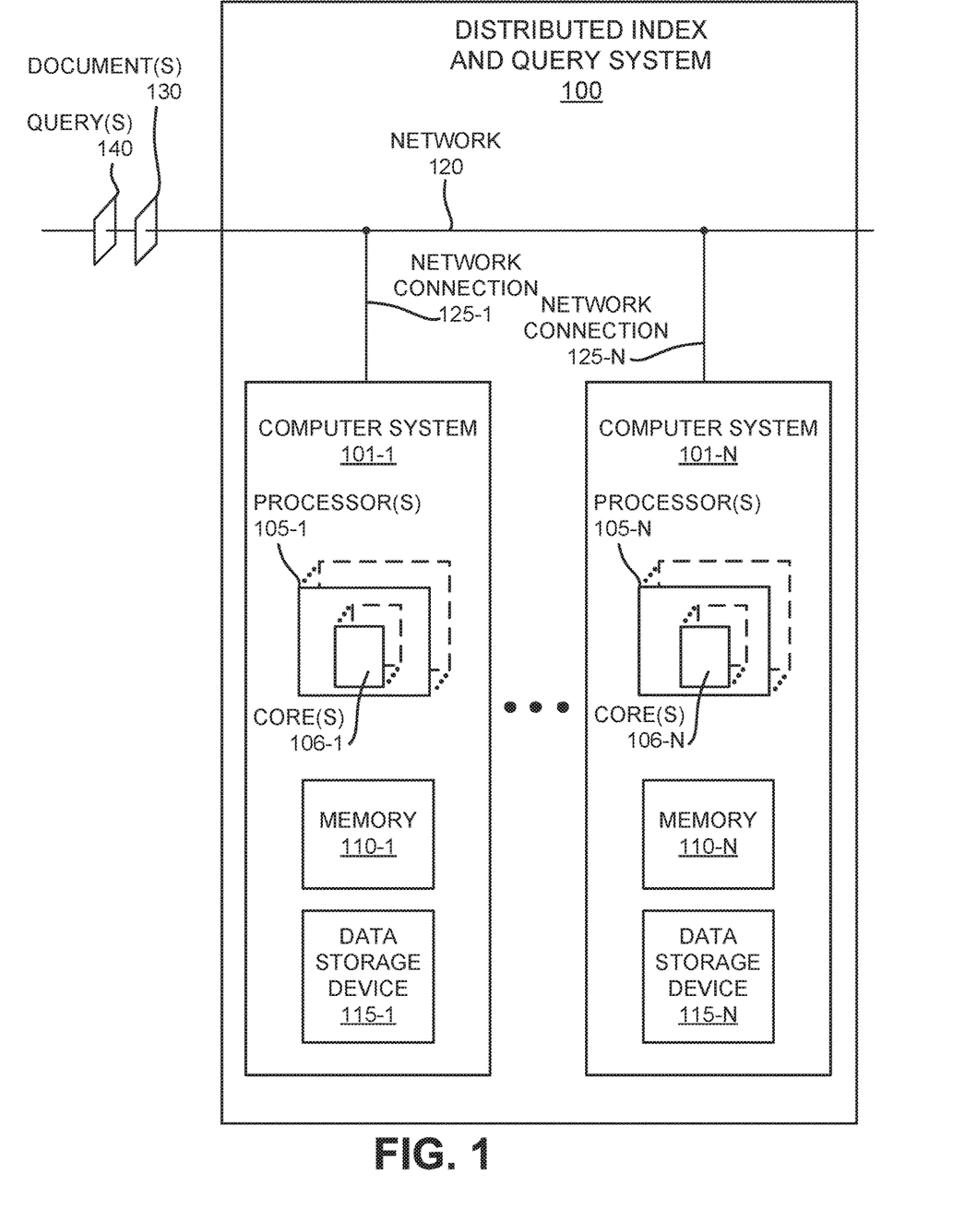
FIG. 1 is an example block diagram of a distributed index and query system that includes a plurality of networked computer systems, in accordance with embodiments.

FIG. 1 is an example block diagram of a distributed index and query system 100 that includes a plurality of networked computer systems (101-1 . . . 101-N), in accordance with embodiments. As depicted in FIG. 1, distributed index and query system 100 includes a plurality of computer systems 101 (101-1 . . . 101-N) communicatively coupled with a network 120. Computer system 101-1 is communicatively coupled to network 120 by network connection 125-1, which may comprise a network interface card or other communicative coupling mechanism. Similarly, computer system 101-N is communicatively coupled to network 120 by network connection 125-N, which may comprise a network interface card or other communicative coupling mechanism. Although only two computer systems 101 (101-1 and 101-N) are illustrated in distributed index and query system 100, more may be included in some embodiments.

Network 120 operates to communicatively couple computer systems 101 (e.g., 101-1 . . . 101-N) with one another as part of a network and to facilitate receipt of documents 130 for indexing, and queries 140 for processing.

Computer system 101-1 includes one or more processors 105-1. Computer system 101-1 includes or has access to a memory 110-1 and a data storage device 115-1. Each included processor 105-1 includes one or more processing cores 106-1. Memory 110-1 typically comprises random access memory. Data storage device 115-1 typically comprises one or some combination of magnetic disks and tapes, solid state drives/"disks," optical disks, and/or direct access storage devices such as hard disk drives.

Computer system 101-N includes one or more processors 105-N. Computer system 101-N includes or has access to a memory 110-N and a data storage device 115-N. Each included processor 105-N includes one or more processing cores 106-N. Memory 110-N typically comprises random access memory. Data storage device 115-N typically comprises one or some combination of magnetic disks and tapes, solid state drives/"disks," optical disks, and/or direct access storage devices such as hard disk drives.

The number of processing cores 106 in a processor 105 defines the total number of processing threads available in that processor, where one processing core equates to one processing thread. Adding up the total number of processing cores 106 in the total number of processors 105 in computer system 101 provides the total number of processing threads available in that computer system 101. In distributed index and query system 100, the total number of processing threads is determined by adding up the processing threads of each computer system 101 (e.g., 101-1 . . . 101-N) in the distributed index and query system 100. Some portion of the total number of processing threads in distributed index and query system 100 may be utilized for indexing documents, such as document(s) 130, received via a network connection 125 to network 120. Similarly, some portion of the total number of processing threads in distributed index and query system 100 may be utilized for processing and responding to queries of indexed documents, such as query 140, received via a network connection 125 to network 120.

Figure 2:
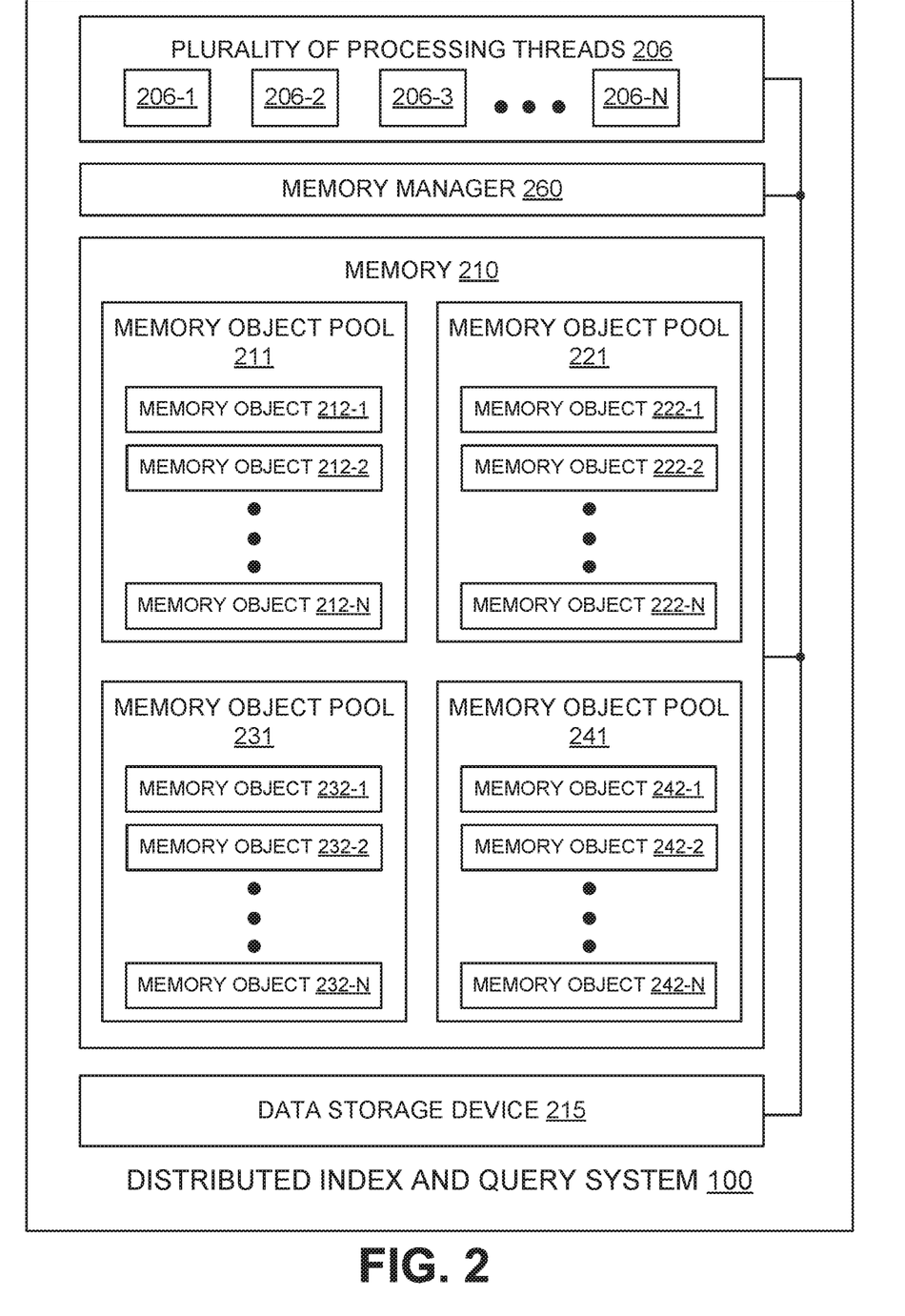
FIG. 2 illustrates an example of distributed index and query system with a memory configured with a plurality of memory object pools, in accordance with various embodiments.

FIG. 2A illustrates an example of distributed index and query system with a memory 210 configured with a plurality of memory object pools 211, 221, 231, and 241, in accordance with an embodiment. Although not depicted, in some embodiments, memory 210 also includes a cache to which a memory object (212, 222, 232, 242) may be assigned.

In FIG. 2, memory 210 is an abstraction which is made up of all or part of one or more of the memories 110 depicted in FIG. 1. Similarly, data storage device 215 is an abstraction which is made up of all or part of one or more of the data storage devices 115 depicted in FIG. 1. Plurality of processing threads 206 is made up from processing threads (206-1, 206-2, 206-3 . . . 206-N) provided from the total number of processing threads (provided by processing cores 106) available across distributed index and query system 100. Individual processing threads in plurality of processing threads 206 are allocated for use in tasks such as indexing received documents 130 and responding to received queries 140. Memory manager 260 may be implemented with its own processors and hardware and/or with one or more processing threads 206.

Distributed index and query system 100 operates to index and store lists of documents. The list is typically a fixed number of documents collected in a batch (also referred to as a "full batch"). Each batch/full batch contains a fixed number, N, of documents, such as 50, 100, 1,000, 20,000, etc. Indexed documents are stored on data storage device 215 in container spaces that are also fixed in size, such as 100 megabytes, 1 gigabyte, 1 terabyte, etc. In order to fully fill the fixed size of the container space the last set of indexed documents is often a partial batch, which just fills up the remaining space in the container space. A partial batch has fewer documents than the fixed number of N documents in a full batch, and may contain anywhere from 1 document to N−1 documents.

Memory object pool 211 is a collection of memory objects 212 (212-1, 212-2 . . . 212-N) that are available for use by processing threads 206 through a process called "borrowing." When a memory object 212 is "borrowed" from the memory object pool it is exclusively borrowed and owned by the caller (e.g., a processing thread such as processing thread 206-1), which has exclusive read access and exclusive write access to the borrowed memory object 212. Once the memory object 212 is no longer needed by the borrower, it is released back to the memory object pool 211 so another processing thread can borrow it and use it. In some embodiments memory objects 212 are used to hold full batches of serialized documents, and are thus borrowed by processing threads for serialization of a full batch of documents or for holding a decompressed serialized full batch of documents.

In an initial state of distributed index and query system 100, all of the memory objects 212 may be allocated by memory manager 260 as byte arrays which may be sufficiently large to handle most of the tasks within distributed index and query system 100 for which they are borrowed. In this initial state, memory objects 212 may start at the same or similar size as one another, but the sizes may then change over time as various memory objects increase or decrease in size. As will be discussed, memory objects 212 which are deemed to have grown over time to an outlier size are trimmed. For example, if a memory object 212-1 grows over time to some predetermined multiple (such as 2×, 3×, or 4×) of the average sized memory object 212, memory manager 260 trims this memory block back to the average size and releases or reuses the trimmed portion.

Memory object pool 221 is a collection of memory objects 222 (222-1, 222-2 . . . 222-N) that are available for use by processing threads 206 through a process called "borrowing." When a memory object 222 is "borrowed" from the memory object pool it is exclusively borrowed and owned by the caller (e.g., a processing thread such as processing thread 206-2), which has exclusive read access and exclusive write access to the borrowed memory object 222. Once the memory object 222 is no longer needed by the borrower, it is released back to the memory object pool 221 so another processing thread can borrow it and use it. In some embodiments memory objects 222 are used to hold full batches of compressed serialized documents, and are thus borrowed by processing threads for compression of a full batch of documents or for holding a compressed serialized full batch of documents.

In an initial state of distributed index and query system 100, all of the memory objects 222 may be allocated by memory manager 260 as byte arrays which may be sufficiently large to handle most of the tasks within distributed index and query system 100 for which they are borrowed. In this initial state, memory objects 222 may start at the same or similar size as one another, but the sizes may then change over time as various memory objects increase or decrease in size. As will be discussed, memory objects 222 which are deemed to have grown over time to an outlier size are trimmed. For example, if a memory object 222-1 grows over time to some predetermined multiple (such as 2×, 3×, or 4×) of the average sized memory object 232, memory manager 260 trims this memory block back to the average size and releases or reuses the trimmed portion.

Memory object pool 231 is a collection of memory objects 232 (232-1, 232-2 . . . 232-N) that are available for use by processing threads 206 through a process called "borrowing." When a memory object 232 is "borrowed" from the memory object pool it is exclusively borrowed and owned by the caller (e.g., a processing thread such as processing thread 206-1), which has exclusive read access and exclusive write access to the borrowed memory object 232. Once the memory object 232 is no longer needed by the borrower, it is released back to the memory object pool 231 so another processing thread can borrow it and use it. In some embodiments memory objects 232 are used to hold partial batches of serialized documents, and are thus borrowed by processing threads for serialization of a partial batch of documents or for holding a decompressed serialized partial batch of documents. Generally, memory objects 232 have a smaller average size than the average size of memory objects 212. However, because partial batches can vary in size, the actual sizes of memory objects 232 are allowed to vary more greatly away from their average size than the variance which allowed for memory objects 212. Depending on specific settings, variability of the size of memory objects in memory object pool 231 is allowed to be between three times to five times the variability for memory objects in memory object pool 211.

In an initial state of distributed index and query system 100, all of the memory objects 232 may be allocated by memory manager 260 as byte arrays which may be sufficiently large to handle most of the tasks within distributed index and query system 100 for which they are borrowed. In this initial state, memory objects 232 may start at the same or similar size as one another, but the sizes may then change over time as various memory objects increase or decrease in size. As will be discussed, memory objects 232 which are deemed to have grown over time to an outlier size are trimmed. For example, if a memory object 232-1 grows over time to some predetermined multiple (such as 9×, 10×, or 11×) of the average sized memory object 232, memory manager 260 trims this memory block back to the average size and releases or reuses the trimmed portion.

Memory object pool 241 is a collection of memory objects 242 (242-1, 242-2 . . . 242-N) that are available for use by processing threads 206 through a process called "borrowing." When a memory object 242 is "borrowed" from the memory object pool it is exclusively borrowed and owned by the caller (e.g., a processing thread such as processing thread 206-2), which has exclusive read access and exclusive write access to the borrowed memory object 242. Once the memory object 242 is no longer needed by the borrower, it is released back to the memory object pool 241 so another processing thread can borrow it and use it. In some embodiments memory objects 242 are used to hold full batches of compressed serialized documents, and are thus borrowed by processing threads for compression of a full batch of documents or for holding a compressed serialized full batch of documents. Generally, memory objects 242 have a smaller average size than the average size of memory objects 222. However, because partial batches can vary in size, the actual sizes of memory objects 242 are allowed to vary more greatly away from their average size than the variance which allowed for memory objects 222. Depending on specific settings, variability of the size of memory objects in memory object pool 241 is allowed to be between three times to five times the variability for memory objects in memory object pool 221.

In an initial state of distributed index and query system 100, all of the memory objects 242 may be allocated by memory manager 260 as byte arrays which may be sufficiently large to handle most of the tasks within distributed index and query system 100 for which they are borrowed. In this initial state, memory objects 242 may start at the same or similar size as one another, but the sizes may then change over time as various memory objects increase or decrease in size. As will be discussed, memory objects 242 which are deemed to have grown over time to an outlier size are trimmed. For example, if a memory object 242-1 grows over time to some predetermined multiple (such as 9×, 10×, or 11×) of the average sized memory object 242, memory manager 260 trims this memory block back to the average size and releases or reuses the trimmed portion.

When borrowed, if the size of the byte array in the borrowed memory object 212, 222, 232, 242 is larger than what is needed for the task being carried out by the borrower, the memory object can be used without allocating new memory. That is, the byte size of the memory object may not be trimmed down to size if it is too large, rather it is just used as is in order to eliminate the time and processing that would be required to trim it to a specific size and then compact the trimmed portion back into memory 210.

In response to the first memory object containing fewer memory bytes than needed for achieving the first segment processing thread 206-1 communicates with memory manager 260 and to affect the allocation of additional memory bytes from the memory 210 to the first memory object to increase an overall size of the first memory object 212-1. In some embodiments, no attempt is made to determine an exact number of bytes needed. Instead a round number in kilobytes such as: 1 kilobyte, 32 kilobytes, 256 kilobytes, is additionally allocated. This saves time over trying to determine an exact amount to add, and if over allocation occurs it may prevent the need to incrementally allocate more and more memory.

In the illustrated embodiment of FIG. 2A, there are four memory object pools (memory object pool 211, memory object pool 221, memory object pool 231, and memory object pool 241). Each of these four memory object pools is used for one of four different tasks, and thus at the outset the memory objects within each of these pools is sized generally for the particular task for which memory objects in each of the respective pools are borrowed. Over time, and through additional allocations when a memory object is too small for a task and trimming of outlier sized memory objects, each pool becomes even more tailored toward the size of memory objects needed to perform the ongoing specific tasks for which the memory objects in that pool are used. Thus, memory objects in each of the four memory object pools are sized and managed in size for the particular task for which they are borrowed.

As has been described above: memory object pool 211 contains memory objects 212 that are borrowed to handle and temporarily hold full batches of uncompressed documents; memory object pool 221 contains memory objects 222 that are borrowed to handle and temporarily hold full batches of compressed documents; memory object pool 231 contains memory objects 232 that are borrowed to handle and temporarily hold partial batches of uncompressed documents; and memory object pool 241 contains memory objects 242 that are borrowed to handle and temporarily hold partial batches of compressed documents. During index read for serialization of documents, a processing thread determines notes the number of documents in involved, determines if it is dealing with a full batch or partial batch of documents, and borrows from memory object pool 211 for a full batch and from memory object pool 231 for a partial batch. During query read for deserialization of a segment stored on a data storage device a processing thread determines notes the number of documents in involved, determines if it is dealing with a full batch or partial batch of documents, and borrows from memory object pool 221 for a full batch and from memory object pool 241 for a partial batch. For decompression, if a processing thread is dealing with a full batch of documents, it borrows from memory object pool 211; and if dealing with a partial batch of documents borrows, it borrows from memory object pool 231.

This purposeful use for particular tasks allows for efficient borrowing of memory objects that are about the size that are needed for a specific task, without resorting to allocation unless the size of a borrowed memory object needs to be increased. Even in the case of increasing the size, additional memory is allocated in even sized chunks without spending processor cycles and time on trying to gauge exactly how much to allocate. The use of the four memory object pools for specific tasks also shows efficiency gains over using a single all-purpose memory object pool or two slightly focused memory object pools, because it results in: 1) a more efficient overall use of memory than if there were just one or two memory object pools; and 2) pools that more closely match the sizes of the memory objects to the sizes needed for the specific tasks for which they are borrowed than if there were just one or two memory object pools. The second of these reduces instances of a borrowed memory object being wastefully far too large for a task, and also reduces instances and amounts of additional memory allocation when a memory object is too small or far too small for a task.

A cache has not been depicted in FIG. 2A, but may be included in some embodiments. When included, a cache is a space to assign memory objects that are read-only. For example, if a memory object 212 is placed in cache, it becomes read-only. Multiple processing threads can find memory object 212 in the cache and read from it. When a cache has grown past a certain size threshold one or more memory objects assigned to the cache will be evicted and no longer found in cache. If not being called (read from) by a processing thread 206 when the eviction occurs, the evicted memory object may be released to the memory object pool from which it was originally borrowed so that it can be borrowed by any processing thread 206. As will be described further, one or more calling processing threads 206 may still use a memory object that has been ejected while still in the state of being called by the processing thread(s). Eventually, when all calls to an evicted memory object cease, the evicted memory object may be released back to memory object pool from which it was borrowed so that it can be borrowed by any processing thread 206.

Segments, Serialization, Compression, Decompression, and De-Serialization

Figure 3:
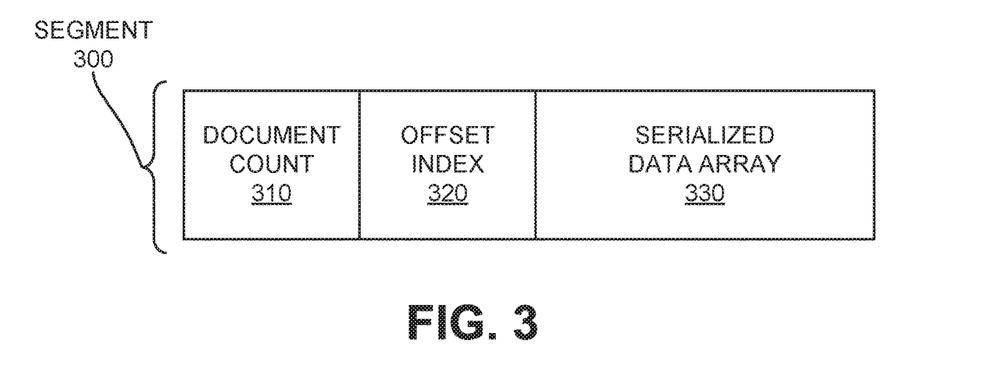
FIG. 3 illustrates an example of a segment with documents stored as a serialized data array, in accordance with various embodiments.

FIG. 3 illustrates an example of a segment 300 with documents stored as a serialized data array 330, in accordance with an embodiment. Segment 300 is a data structure that includes the number of documents serialized, an array of offsets for each of the serialized documents, and the byte array of the serialized documents. Consider an example where processing thread 206-1 receives a list of documents 130 (either a full batch or a partial batch) for indexing.

In an embodiment where a full batch is being serialized, processing thread 206-1 borrows a memory object 212-1 from memory object pool 211. Processing thread 206-1 then serializes the data of the documents 130 into a serialized data array 330, with one document following the next in a serial fashion, that is held as part of segment 300 within memory object 212-1. Each document 130 is variable in size, so the size of the serialized data array 330 and positions of the individual documents 130 within it are not known until all documents 130 are serialized. In some embodiments, because of this variability, processing thread 206-1 interacts with memory manager 260 to have additional bytes allocated to memory object 212-1 if it is not large enough to contain serialized data array 330. This grows the size of the memory object 212-1 when the additionally allocated bytes are added. As part of the serialization, processing thread 206-1 counts the number of documents 130 serialized and keeps this number as a document count 310 as part of segment 300 in memory object 212-1. Also, as part of the serialization, processing thread 206-1 keeps an offset index 320 that provides an index of offsets, in data bytes, within serialized data array 330 to locate the beginning point of each of the documents that has been serialized into serialized data array 330.

In some embodiments, processing thread 206-1 introduces an integer value to segment 300 representing the number of bytes used in segment 300 or in serialized data array 330. This integer provides information available to memory manager 260 that allows memory manager 260 to re-use over-allocated bytes by pooling the over allocated bytes with other over allocated bytes to create another memory object 212.

In an embodiment where a partial batch is being serialized, the procedure is the same except that processing thread 206-1 borrows a memory object 232-1 from memory object pool 231 for the serialization.

Figure 4:
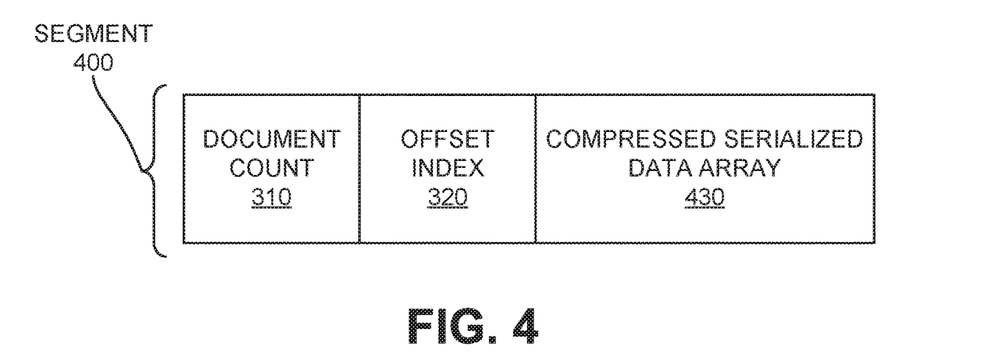
FIG. 4 illustrates an example of a segment with documents stored as compressed serialized data array, in accordance with various embodiments.

FIG. 4 illustrates an example of a segment 400 with documents stored as a compressed serialized data array 430, in accordance with an embodiment. Consider the previous example described in conjunction with FIG. 3 where a full batch has been serialized. Once processing thread 206-1 has created serialized segment 300, in one embodiment, the serialized data array is compressed. To perform the compression, processing thread 206-1 borrows a second memory object, memory object 222-1, from memory object pool 221 and then compresses serialized data array 330 of segment 300 from memory object 212-1 into compressed serialized data array 430 in a new segment 400 maintained in memory object 222-1. Any known compression technique can be used. It should be appreciated that the size of the resulting compressed serialized data array 430 is not known until after compression is complete, and is not guaranteed to be smaller than the original. In general, the size of the list of objects serialized in to serialized data array 330 needs to be large enough that compression is effective. In some embodiments, processing thread 206-1 interacts with memory manager 260 to have additional bytes allocated to memory object 222-1 if it is not large enough to contain compressed serialized data array 430. This grows the size of the memory object 222-1 when the additionally allocated bytes are added.

Segment 400 also includes document count 310 and offset index 320, neither of which is compressed. In one embodiment, processing thread 206-1 copies one or both of document count 310 and offset index 320 from memory object 212-1 into segment 400 within memory object 222-1. In another embodiment, processing thread 206-1 foregoes the time and processing associated with copying and just swaps the bytes (i.e., the memory addresses) containing of one or both of document count 310 and offset index 320 from memory object 212-1 into segment 400 within memory object 222-1. This swapping decreases the size of segment 300 and increases the size of segment 400. Once segment 400 has been created, processing thread 206-1 releases memory object 212-1 back to memory object pool 211 where it is once again available to be borrowed by any of the plurality of processing threads 206. Processing thread 206-1 then writes segment 400 into storage on data storage device 215. After the writing is complete, processing thread 206-1 releases memory object 222-1 back to memory object pool 221 where it is once again available to be borrowed by any of the plurality of processing threads 206.

In an embodiment where a partial batch of documents has been serialized and this serialization is now being compressed, the procedure is the same except that processing thread 206-1 has borrowed memory object 232-1 from memory object pool 231 for the serialization and then borrows a memory object 242-1 from memory object pool 241 for the compression.

Figure 5:
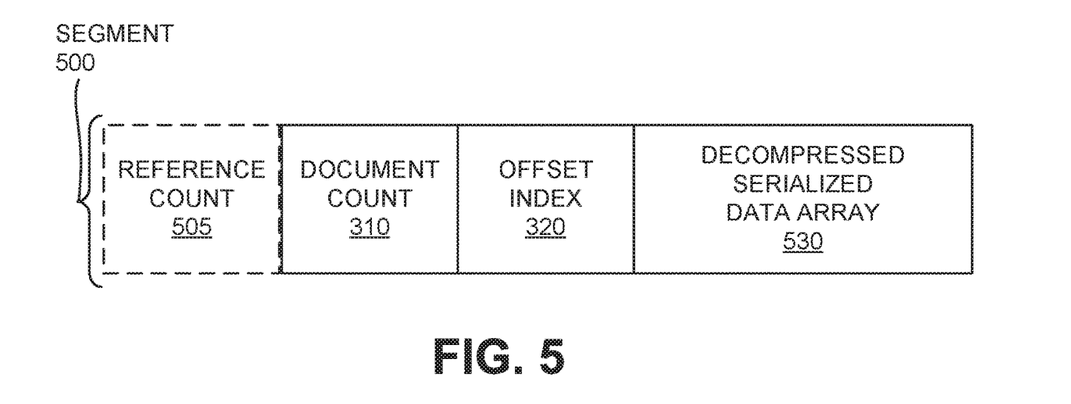
FIG. 5 illustrates an example of a segment with documents stored as a decompressed serialized data array, in accordance with various embodiments.

FIG. 5 illustrates an example of a segment 500 with documents 130 stored as a decompressed serialized data array 530, in accordance with an embodiment. Segment 500 is created by reading segment 400 from data storage device 215 and decompressing the compressed serialized data array 430 to create decompressed serialized data array 530. Each document 130 serialized into the serialized data array 330 (and the identical decompressed serialized data array 530) can be de-serialized directly if the offset within the serialized data array is known, which is why offset index 320 is maintained.

When a query 140 requires a particular document 130, a processing thread, such as processing thread 206-2, locates on data storage device 215 the segment 400 containing the compressed serialized data array 430 which holds the document 130. For purposes of example, consider an instance where decompressed serialized data array 530 will include a full batch of serialized documents (which is determinable from reviewing the document count 310 in segment 400). Processing thread 206-2 borrows a memory object (e.g., memory object 222-2) from memory object pool 221 and reads segment 400 from data storage device 215 into memory object 222-2. Processing thread 206-2 borrows another memory object (e.g., memory object 212-2) from memory object pool 211 and decompresses the compressed serialized data array 430 into segment 500, within memory object 212-2, as decompressed serialized data array 530. Document count 310 and offset index 320 are then swapped (or in some instances copied) from segment 400 to segment 500. After the decompression is complete, processing thread 206-2 releases memory object 222-2 back to memory object pool 211 where it is once again available to be borrowed by any of the plurality of processing threads 206. Processing thread 206-2 can de-serialize the queried document 130 from decompressed serialized data array 530 using the offset index 320 to find it.

In some embodiments, processing thread 206-2 interacts with memory manager 260 to have additional bytes allocated to memory object 212-2 and/or 222-2 if either or both is/are not large enough. This additional allocation grows the size of the memory object when the additionally allocated bytes are added, and the memory object retains these additionally allocated bytes when it is released back to its memory object pool.

Due to the time and processing expense of reading and decompressing segment 500, in some embodiments processing thread 206-2 assigns segment 500 and memory object 212-2 to a cache of memory 210, for read-only access, to amortize the time and expense of the retrieval and decompression over additional reads of one or more documents in segment 500 while cached. In some embodiments, this assignment to the cache includes associating a reference count 505 with segment 500 and/or memory object 212-2. For example, the reference count may be added on to segment 500 in some embodiments. The reference count is set at one when memory object 212-2 is assigned to a cache. The reference count is further incremented by one while being called (read) by a processing thread, and decremented by one when the call is complete. When memory object 212-2 is caused to be ejected due to needing room in the cache, the reference count 505 is decremented upon the ejection, and when it reaches zero it is released back to memory object pool 211.

In an embodiment where a partial batch of compressed serialized documents is being decompressed, the procedure is the same except that processing thread 206-2 borrows memory object 232-1 from memory object pool 231 to read segment 400 from the data storage device and borrows memory object 242-2 from memory object pool 241 to decompress segment 400 into segment 500.

Flags

Figure 6:
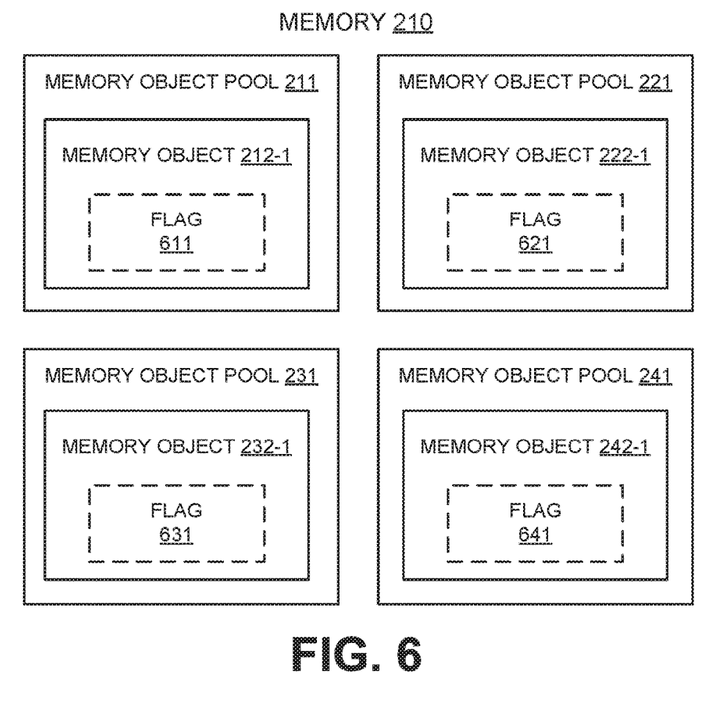
FIG. 6 illustrates an example of flags set on memory objects, in accordance with various embodiments.

FIG. 6 illustrates an example of flags set on memory objects, in accordance with various embodiments. In order to facilitate the return of a released memory object to the memory object pool from which it was borrowed, in some embodiments, memory manager 260 sets a flag on the memory object to associate the memory object with a certain memory object pool. Thus, by looking at the flag of a released memory object, memory manager 260 can determine the proper memory object pool, of the plurality of memory object pools, in which to place it. As non-limiting examples: flag 611 associates memory object 212 with memory object pool 211; flag 621 associates memory object 222 with memory object pool 221; flag 631 associates memory object 232 with memory object pool 231; and flag 641 associates memory object 242 with memory object pool 241.

Filling a Fixed Storage Space

Figure 7:
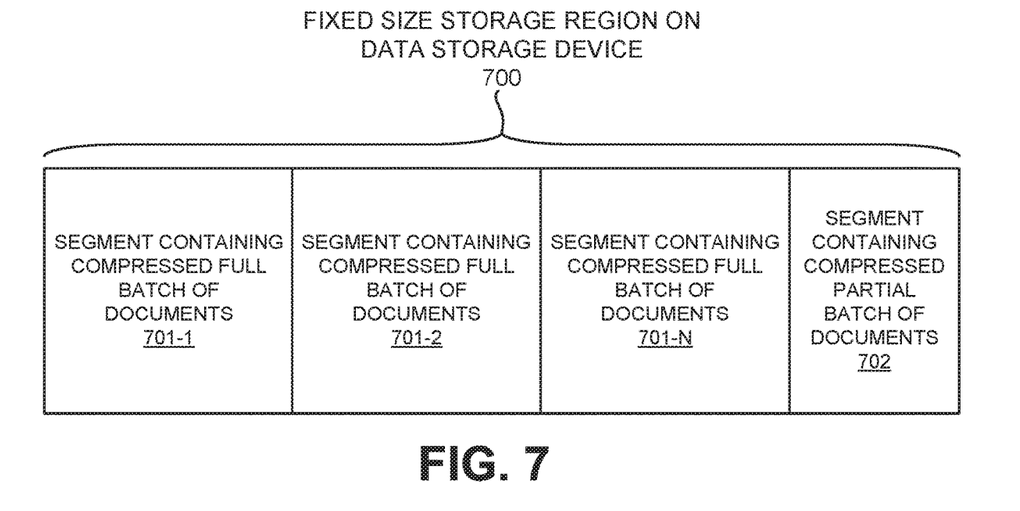
FIG. 7 illustrates an example of segments written into a fixed size storage region of a data storage device, in accordance with various embodiments.

FIG. 7 illustrates an example of segments written into a fixed size storage region 700 of a data storage device 215, in accordance with various embodiments. As previously described, distributed index and query system 100 operates to index and store lists of documents. The list is typically a fixed number of documents collected in a batch (also referred to as a "full batch"). Each batch/full batch contains a fixed number, N, of documents, such as 50, 100, 1,000, 20,000, etc. Indexed documents are stored on data storage device 215 in container spaces that are also fixed in size, such as 100 megabytes, 1 gigabyte, 1 terabyte, etc. Fixed size storage region 700 is an example of a container space that is fixed in size. Segments, such as segment 400, which contain compressed serialized data arrays are stored in fixed storage region. At first, these segments contain full batches of documents that have been serialized and compressed (e.g., segment 701-1, segment 701-2 . . . segment 701-N). However, when the remaining fixed space in fixed size storage region 700 is not sufficient to store a segment that has a full batch of compressed serialized document, a segment is produced that has only a partial batch of documents that have been compressed and serialized (e.g., segment 702). As depicted, segment 702 is the final segment stored, and is used to fully fill the fixed size storage region 700.

Example Methods of Operation

Figure 8A:
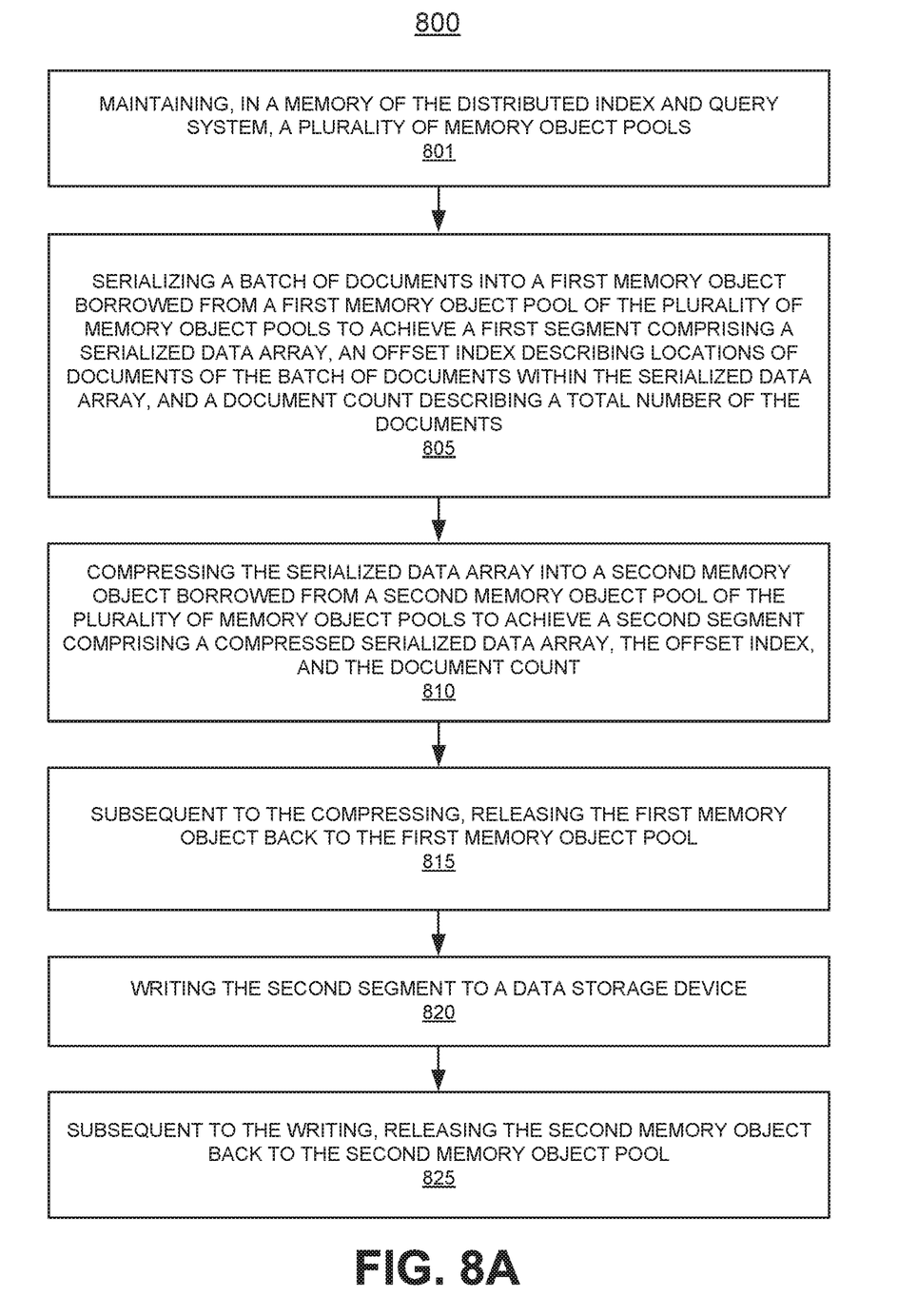
FIGS. 8A-8B illustrate a flow diagram of a method of memory object pool use in a distributed index and query system, in accordance with various embodiments.
Figure 8B:
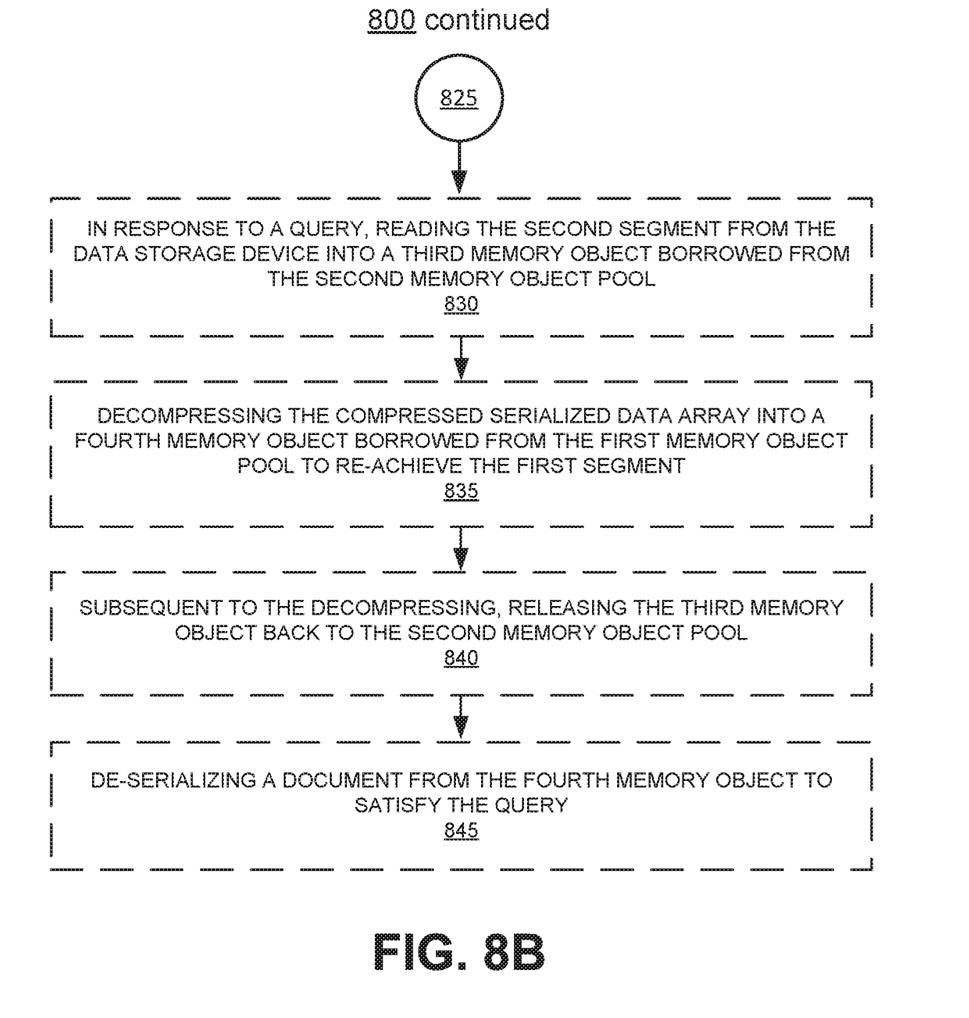
Figure 9:
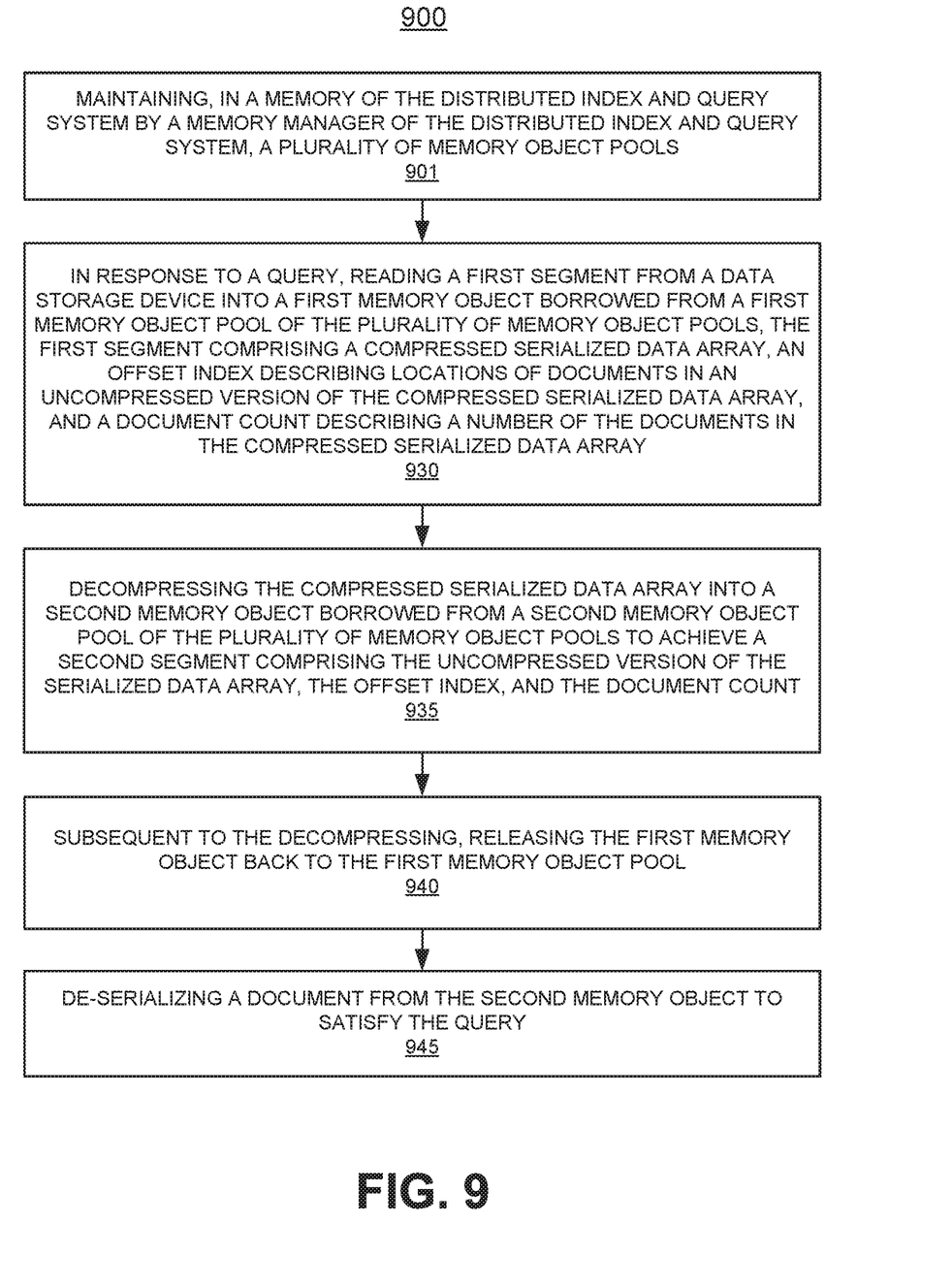
FIG. 9 illustrates a flow diagram of a method of memory object pool use in a distributed index and query system, in accordance with various embodiments.

The following discussion sets forth in detail the operation of some example methods of operation of embodiments. With reference to FIGS. 8A-8B and FIG. 9, flow diagrams 800 and 900 illustrate example procedures used by various embodiments. Flow diagrams 800 and 900 include some procedures that, in various embodiments, are carried out by a processor under the control of computer-readable and computer-executable instructions. In this fashion, procedures described herein and in conjunction with flow diagrams 800 and/or 900 are, or may be, implemented using a computer system (which may be a distributed computer system), in various embodiments. The computer-readable and computer-executable instructions can reside in any non-transitory computer readable storage media. Some non-limiting examples of non-transitory computer readable storage media include random access memory, read-only memory, magnetic disks and tapes, solid state drives/ "disks," optical disks, direct access storage devices, any or all of which may be employed with a computing system such as distributed computing system 100. The computer-readable and computer-executable instructions, which reside on non-transitory computer readable storage media, are used to control or operate in conjunction with, for example, one or some combination of processors of distributed index and query system 100, a computer system 101, or the like. It is appreciated that the processor(s) may be physical or virtual or some combination (it should also be appreciated that a virtual processor is implemented on physical hardware). Although specific procedures are disclosed in flow diagrams 800 and 900, such procedures are examples. That is, embodiments are well suited to performing various other procedures or variations of the procedures recited in flow diagram 800 and/or 900. Likewise, in some embodiments, the procedures in flow diagrams 800 and/or 900 may be performed in an order different than presented and/or not all of the procedures described in one or more of these flow diagrams may be performed. It is further appreciated that procedures described in flow diagram 800 and/or 900 may be implemented in hardware, or a combination of hardware with firmware and/or software.

FIG. 8A is a flow diagram 800 of a method of memory object pool use in a distributed index and query system (such as distributed index and query system 100), in accordance with various embodiments. Reference is made to items in FIGS. 1, 2, 3, 4, 5, 6, and 7 in the description of flow diagram 800.

At 801 of flow diagram 800, in one embodiment, the method maintains, in a memory 210 of the distributed index and query system 100, a plurality of memory object pools (e.g., 211, 221, 231, 241). The maintaining can be performed by a memory manager, such as memory manager 260. The maintaining, can include monitoring and controlling size growth within the memory object pools. Different memory object pools may have different rules governing how much the size of memory objects is allowed to vary and when an outlier object should be trimmed. In one embodiment, responsive to a memory object, such as memory object 212-1 in memory object pool 211, exceeding a preset multiple of an average size of memory objects within this memory object pool, the size of the memory object is trimmed down to the average size of memory objects in its memory object pool. The multiple may be a multiple such as 2.5 times the average, 3 times the average, 3.5 times the average, etc. In another embodiment, responsive to a memory object, such as memory object 232-1 in memory object pool 231, exceeding a preset multiple of an average size of memory objects within this memory object pool, the size of the memory object is trimmed down to the average size of memory objects in its memory object pool. The multiple may be a multiple such as 9.5 times the average, 10 times the average, 10.5 times the average, etc.

At 805 of flow diagram 800, in one embodiment, the method serializes a batch of documents 130 into a first memory object borrowed from a first memory object pool of the plurality of memory object pools to achieve a first segment 300 comprising a serialized data array 330, an offset index 320 describing locations of documents of the batch of documents within the serialized data array 330, and a document count 310 describing a total number of the documents. The serializing is accomplished by a first processing thread (e.g., processing thread 206-1) of a plurality of processing threads 206. The documents 130 are received via a connection to network 120. The batch may be a full batch N documents or a partial batch of 1 to N−1, as has been described previously herein. When a full batch of documents is serialized, the first memory object (e.g., 212-1) is borrowed from memory object pool 211. When a partial batch of documents is serialized, the first memory object (e.g., 232-1) is borrowed from memory object pool 231.

In response to the first memory object containing fewer memory bytes than needed for achieving the first segment processing thread 206-1 communicates with memory manager 260 and to affect the allocation of additional memory bytes from the memory 210 to the first memory object to increase an overall size of the first memory object 212-1. In some embodiments, no attempt is made to determine an exact number of bytes needed. Instead a round number in kilobytes such as 1 kilobyte, 16 kilobytes, 128 kilobytes, is additionally allocated. This saves time over trying to determine an exact amount to add, and if over allocation occurs it may prevent the need to incrementally allocate more and more memory.

Conversely, in some embodiments, in response to the first memory object containing excess memory bytes over what are needed for achieving the first segment 300, the first memory object is simply used without trimming the excess memory bytes from the first memory object. This foregoes the time and processing expense of trimming the extra bytes away and then compacting memory 210 after they are trimmed.

At 810 of flow diagram 800, in one embodiment, the method compresses the serialized data array into a second memory object borrowed from a second memory object pool of the plurality of memory object pools to achieve a second segment 400 comprising a compressed serialized data array 430, the offset index 320, and the document count 310. The compressing can be accomplished by processing thread 206-1. In some embodiments, the offset index is moved from segment 300 to segment 400 by swapping bytes comprising the offset index 320 from the first memory object into the second memory object. This swapping is faster and less resource intensive than copying (which may occur in other embodiments). When a full batch of serialized documents is compressed, the first memory object (e.g., 222-1) is borrowed from memory object pool 221. When a partial batch of serialized documents is compressed, the first memory object (e.g., 242-1) is borrowed from memory object pool 241.

At 815 of flow diagram 800, in one embodiment, subsequent to the compressing described at 810, the method releases the first memory object back to the memory object pool from which it was borrowed. After release back to the memory object pool, it can be borrowed by any processing thread of the plurality of processing threads 206. Once released, memory manager 260 may route the first memory object to the first memory object pool based on presence of a first memory object pool flag on the first memory object. For example, a flag 611 would indicate that a memory object 212-1 should be routed to memory object pool 211; while, a flag 631 would indicate that a memory object 232-1 should be routed to memory object pool 231.

At 820 of flow diagram 800, in one embodiment, the method writes the second segment 400 to a data storage device 215. This can comprise processing thread 206-1 performing the writing.

At 825 of flow diagram 800 subsequent to the writing, in one embodiment, the method releases the second memory object back to the memory object pool from which it was borrowed. After release, back to the memory object pool, it can be borrowed by any processing thread of the plurality of processing threads 206. Once released, memory manager 260 may route the second memory object to the second memory object pool based on presence of a second memory object pool flag on the second memory object. For example, a flag 621 would indicate that a memory object 222-1 should be routed to memory object pool 221; while, a flag 641 would indicate that a memory object 242-1 should be routed to memory object pool 241.

Referring now to FIG. 8B, at 830 of flow diagram 800, in response to a query 140, the method reads second segment 400 from the data storage device 215 into a third memory object borrowed from the second memory object pool. When the segment being read includes a full batch of compressed documents, the third memory object (e.g., 222-2) is borrowed from memory object pool 221. When the segment being read includes a partial batch of compressed documents, the third memory object (e.g., 242-2) is borrowed from memory object pool 241. The reading can be accomplished by any processing thread 206.

At 835 of flow diagram 800, in one embodiment, the method as described in 801-830 further comprises decompressing the compressed serialized data array into a fourth memory object borrowed from the first memory object pool to re-achieve the first segment 300 as segment 500. When the segment being decompressed includes a full batch of compressed documents, the fourth memory object (e.g., 212-2) is borrowed from memory object pool 211. When the segment being decompressed includes a partial batch of compressed documents, the fourth memory object (e.g., 232-2) is borrowed from memory object pool 231. The decompression can be accomplished by any processing thread 206.

At 840 of flow diagram 800, in one embodiment subsequent to the decompressing, the method as described in 801-835 further comprises, releasing the third memory object back to the second memory object pool (i.e., the memory object pool from which it was borrowed). Responsive to the release, as part of maintaining the memory object pools, the memory manager 260 determines that the third memory object should be returned to the second memory object pool based on the flag that has been set on the memory object for this purpose.

At 845 of flow diagram 800, in one embodiment, the method as described in 801-840 further comprises de-serializing a document from the fourth memory object to satisfy the query. Any processing thread 206 can accomplish the de-serializing. In some embodiments, after a response to the query has been provided the fourth memory object is released back to the memory object pool from which it was borrowed. Upon this release, memory manager 260 can use a flag on the fourth memory object to route it back to its originating memory object pool. In some embodiments, rather than being released, the fourth memory object is assigned to a cache.

FIG. 9 is a flow diagram 900 of a method of memory use in a distributed index and query system (such as distributed index and query system 100), in accordance with various embodiments. Reference is made to items in FIGS. 1, 2, 3, 4, 5, 6, 7 and in the description of flow diagram 800.

At 901 of flow diagram 900, in one embodiment, the method maintains, in a memory 210 of the distributed index and query system 100, a plurality of memory object pools (e.g., 211, 221, 231, 241). The maintaining can be performed by a memory manager, such as memory manager 260. The maintaining, can include monitoring and controlling size growth within the memory object pools. Different memory object pools may have different rules governing how much the size of memory objects is allowed to vary and when an outlier object should be trimmed. In one embodiment, responsive to a memory object, such as memory object 212-1 in memory object pool 211, exceeding a preset multiple of an average size of memory objects within this memory object pool, the size of the memory object is trimmed down to the average size of memory objects in its memory object pool. The multiple may be a multiple such as 2.5 times the average, 3 times the average, 3.5 times the average, etc. In another embodiment, responsive to a memory object, such as memory object 232-1 in memory object pool 231, exceeding a preset multiple of an average size of memory objects within this memory object pool, the size of the memory object is trimmed down to the average size of memory objects in its memory object pool. The multiple may be a multiple such as 9.5 times the average, 10 times the average, 10.5 times the average, etc.

The maintaining can also include memory manager 260 setting flags on memory objects to associate them with their respective memory object pools, and upon release from being borrowed using the flag to determine the pool from which a memory object was borrowed and to which to route it for return.

At 930 of flow diagram 900 in response to a query 140, the method reads a first segment 400 from a data storage device 215 into a first memory object borrowed from a first memory object pool. When the segment being read includes a full batch of compressed documents, the first memory object (e.g., 222-2) is borrowed from memory object pool 221. When the segment being read includes a partial batch of compressed documents, the first memory object (e.g., 242-2) is borrowed from memory object pool 241. The reading can be accomplished by any processing thread 206.

At 935 of flow diagram 900, in one embodiment, the method comprises decompressing the compressed serialized data array into a second memory object borrowed from a second memory object pool to achieve a second segment 500 comprising the uncompressed version of the serialized data array 330, the offset index 320, and the document count 310. When the segment being decompressed includes a full batch of compressed documents, the second memory object (e.g., 212-2) is borrowed from memory object pool 211. When the segment being decompressed includes a partial batch of compressed documents, the second memory object (e.g., 232-2) is borrowed from memory object pool 231. The decompression can be accomplished by any processing thread 206. It should be appreciated that serialized data array 330 and uncompressed serialized data array 530 are identical, except that uncompressed serialized data array 530 has gone through compression and decompression.

At 940 of flow diagram 900, in one embodiment subsequent to the decompressing, the method further comprises, releasing the first memory object back to the first memory object pool (i.e., the memory object pool from which it was borrowed). Responsive to the release, as part of maintaining the memory object pools, the memory manager 260 determines that the first memory object should be returned to the first memory object pool based on the flag that has been set on the memory object for this purpose.

At 945 of flow diagram 900, in one embodiment, the method as described in 940 further comprises further comprises de-serializing a document from the second memory object to satisfy the query. Any processing thread 206 can accomplish the de-serializing. In some embodiments, after a response to the query has been provided the second memory object is released back to the memory object pool from which it was borrowed. Upon this release, memory manager 260 can use a flag on the second memory object to route it back to its originating memory object pool. In some embodiments, rather than being released, the second memory object is assigned to a cache.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A method of memory object pool use in a distributed index and query system, the method comprising:

maintaining, in a memory of the distributed index and query system, a plurality of memory object pools;

serializing a batch of documents into a first memory object borrowed from a first memory object pool of the plurality of memory object pools to achieve a first segment comprising a serialized data array, an offset index describing locations of documents of the batch of documents within the serialized data array, and a document count describing a total number of the documents;

compressing the serialized data array into a second memory object borrowed from a second memory object pool of the plurality of memory object pools to achieve a second segment comprising a compressed serialized data array, the offset index, and the document count;
subsequent to the compressing, releasing the first memory object back to the first memory object pool;
writing the second segment to a data storage device; and
subsequent to the writing, releasing the second memory object back to the second memory object pool.

2. The method as recited in claim 1, further comprising:
in response to a query, reading the second segment from the data storage device into a third memory object borrowed from the second memory object pool;
decompressing the compressed serialized data array into a fourth memory object borrowed from the first memory object pool to re-achieve the first segment;
subsequent to the decompressing, releasing the third memory object back to the second memory object pool; and
de-serializing a document from the fourth memory object to satisfy the query.

3. The method as recited in claim 1, wherein maintaining, in a memory of the distributed index and query system, a plurality of memory object pools comprises:
responsive to the first memory object exceeding a preset multiple of an average size of memory objects within the first memory object pool, trimming down a size of the first memory object to the average size of memory objects in the first memory object pool.

4. The method as recited in claim 1, wherein maintaining, in a memory of the distributed index and query system, a plurality of memory object pools comprises:
responsive to the second memory object exceeding a preset multiple of an average size of memory objects within the second memory object pool, trimming down a size of the second memory to the average size of memory objects in the second memory object pool.

5. The method as recited in claim 1, wherein the serializing a batch of documents into a first memory object borrowed from a first memory object pool of the plurality of memory object pools to achieve a first segment comprising a serialized data array comprises:
serializing a full batch of documents into the first memory object borrowed from the first memory object pool of the plurality of memory object pools to achieve the first segment comprising the serialized data array, wherein the full batch of documents contains a fixed number of N documents and a partial batch of documents contains between 1 document and N−1 documents.

6. The method as recited in claim 1, wherein the serializing a batch of documents into a first memory object borrowed from a first memory object pool of the plurality of memory object pools to achieve a first segment comprising a serialized data array comprises:
serializing a partial batch of documents into the first memory object borrowed from the first memory object pool of the plurality of memory object pools to achieve the first segment comprising the serialized data array, wherein a full batch of documents contains a fixed number of N documents and the partial batch of documents contains between 1 document and N−1 documents.

7. The method as recited in claim 1, wherein the serializing a batch of documents into a first memory object borrowed from a first memory object pool of the plurality of memory object pools to achieve a first segment comprising a serialized data array further comprises:
responsive to the first memory object containing fewer memory bytes than needed for achieving the first segment, allocating additional memory bytes from the memory to the first memory object to increase an overall size of the first memory object.

8. The method as recited in claim 1, wherein the serializing a batch of documents into a first memory object borrowed from a first memory object pool of the plurality of memory object pools to achieve a first segment comprising a serialized data array further comprises:
responsive to the first memory object containing excess memory bytes over what are needed for achieving the first segment, using the first memory object without trimming the excess memory bytes from the first memory object.

9. The method as recited in claim 1, wherein the releasing the first memory object back to the first memory object pool comprises:
routing, by a memory manager, the first memory object to the first memory object pool based on presence of a first memory object pool flag on the first memory object.

10. The method as recited in claim 1, wherein, releasing the second memory object back to the second memory object pool comprises:
routing, by a memory manager, the second memory object to the second memory object pool based on presence of a second memory object pool flag on the second memory object.

11. A non-transitory computer readable storage medium having computer readable program code stored thereon for causing a computer system to perform a method of memory object pool use in a distributed index and query system, the method comprising:
maintaining, in a memory of the distributed index and query system by a memory manager of the distributed index and query system, a plurality of memory object pools;
in response to a query, reading a first segment from a data storage device into a first memory object borrowed from a first memory object pool of the plurality of memory object pools, the first segment comprising a compressed serialized data array, an offset index describing locations of documents in an uncompressed version of the compressed serialized data array, and a document count describing a number of the documents in the compressed serialized data array;
decompressing the compressed serialized data array into a second memory object borrowed from a second memory object pool of the plurality of memory object pools to achieve a second segment comprising the uncompressed version of the serialized data array, the offset index, and the document count;
subsequent to the decompressing, releasing the first memory object back to the first memory object pool; and
de-serializing a document from the second memory object to satisfy the query.

12. The non-transitory computer readable storage medium of claim 11, wherein the uncompressed version of the serialized data is a full batch of serialized documents, and wherein the full batch of documents contains a fixed number of N documents and a partial batch of documents contains between 1 document and N−1 documents, and wherein the maintaining, in a memory of the distributed index and query system by a memory manager of the distributed index and query system, a plurality of memory object pools comprises:
responsive to the first memory object exceeding a three times multiple of an average size of memory objects in the first memory object pool, trimming the first memory object down to an average size of memory objects in the first memory object pool.

13. The non-transitory computer readable storage medium of claim 11, wherein the uncompressed version of the serialized data is a full batch of serialized documents, and wherein the full batch of documents contains a fixed number of N documents and a partial batch of documents contains between 1 document and N−1 documents, and wherein the maintaining, in a memory of the distributed index and query system by a memory manager of the distributed index and query system, a plurality of memory object pools comprises:

responsive to the second memory object exceeding a three times multiple of an average size of memory objects in the second memory object pool, trimming the second memory object down to an average size of memory objects in the second memory object pool.

14. The non-transitory computer readable storage medium of claim 11, wherein the uncompressed version of the serialized data is a partial batch of serialized documents, and wherein a full batch of documents contains a fixed number of N documents and the partial batch of documents contains between 1 document and N−1 documents, and wherein the maintaining, in a memory of the distributed index and query system by a memory manager of the distributed index and query system, a plurality of memory object pools comprises:

responsive to the first memory object exceeding a ten times multiple of an average size of memory objects in the first memory object pool, trimming the first memory object down to an average size of memory objects in the first memory object pool.

15. The non-transitory computer readable storage medium of claim 11, wherein the uncompressed version of the serialized data is a partial batch of serialized documents, and wherein a full batch of documents contains a fixed number of N documents and the partial batch of documents contains between 1 document and N−1 documents, and wherein the maintaining, in a memory of the distributed index and query system by a memory manager of the distributed index and query system, a plurality of memory object pools comprises:

responsive to the second memory object exceeding a ten times multiple of an average size of memory objects in the second memory object pool, trimming the second memory object down to an average size of memory objects in the second memory object pool.

16. The non-transitory computer readable storage medium of claim 11, wherein the maintaining, in a memory of the distributed index and query system by a memory manager of the distributed index and query system, a plurality of memory object pools comprises:

setting a flag on the first memory object to associate the first memory object with the first memory object pool; and responsive to the release of the first memory object, determining that the first memory object should be returned to the first memory object pool based on the flag.

17. A distributed index and query system comprising:
a data storage device;
a plurality of processors, the plurality of processors comprising a plurality of processing threads;
a memory coupled with the data storage device and the plurality of processors, the memory comprising a plurality of memory object pools; and
a memory manager configured to maintain the plurality of memory object pools; and
wherein a first processing thread of the plurality of processing threads is configured to:
serialize a batch of documents into a first memory object borrowed from a first memory object pool of the plurality of memory object pools to achieve a first segment comprising a serialized data array, an offset index describing locations of documents of the batch of documents within the serialized data array, and a document count describing a total number of the documents;
compress the serialized data array into a second memory object borrowed from a second memory object pool of the plurality of memory object pools to achieve a second segment comprising a compressed serialized data array, the offset index, and the document count;
subsequent to the compression, release the first memory object back to the first memory object pool;
write the second segment to a data storage device; and
subsequent to the writing, release the second memory object back to the second memory object pool.

18. The distributed index and query system of claim 17, wherein a second processing thread of the plurality of processing threads is configured to:
in response to a query, read the second segment from the data storage device into a third memory object borrowed from the second memory object pool;
decompress the compressed serialized data array into a fourth memory object borrowed from the first memory object pool to re-achieve the first segment;
subsequent to the decompression, release the third memory object back to the second memory object pool; and
de-serializing a document from the fourth memory object to satisfy the query.

19. The distributed index and query system of claim 17, wherein the batch of documents comprises a full batch of documents, and wherein the full batch of documents contains a fixed number of N documents and a partial batch of documents contains between 1 document and N−1 documents.

20. The distributed index and query system of claim 17, wherein the batch of documents comprises a partial batch of documents, and wherein a full batch of documents contains a fixed number of N documents and the partial batch of documents contains between 1 document and N−1 documents.

* * * * *